United States Patent
Tanaka

[11] Patent Number: 5,739,960
[45] Date of Patent: Apr. 14, 1998

[54] ZOOM LENS DEVICE WITH FIVE LENS UNITS

[75] Inventor: Tsunefumi Tanaka, Yokohama, Japan

[73] Assignee: Canon Kabushiki Kaisha, Tokyo, Japan

[21] Appl. No.: 787,544

[22] Filed: Jan. 22, 1997

[30] Foreign Application Priority Data

Jan. 25, 1996 [JP] Japan .................. 8-031452

[51] Int. Cl.$^6$ .................. G02B 15/14; G02B 3/02
[52] U.S. Cl. .................. 359/683; 359/676; 359/708
[58] Field of Search .................. 359/676, 683, 359/680, 681, 682, 708, 713, 714

[56] References Cited

U.S. PATENT DOCUMENTS

| | | | |
|---|---|---|---|
| 4,776,680 | 10/1988 | Tanaka | 350/427 |
| 4,781,446 | 11/1988 | Tanaka et al. | 350/426 |
| 4,830,477 | 5/1989 | Takahashi et al. | 350/428 |
| 4,865,434 | 9/1989 | Matsushita et al. | 350/430 |
| 5,059,007 | 10/1991 | Tanaka | 359/676 |
| 5,179,473 | 1/1993 | Yano et al. | 359/691 |
| 5,229,886 | 7/1993 | Tanaka | 359/683 |
| 5,325,236 | 6/1994 | Tanaka | 359/689 |
| 5,528,427 | 6/1996 | Tanaka et al. | 359/683 |
| 5,568,321 | 10/1996 | Ogawa et al. | 359/676 |
| 5,576,890 | 11/1996 | Tanaka et al. | 359/686 |

FOREIGN PATENT DOCUMENTS

| | | |
|---|---|---|
| 49-23912 | 6/1974 | Japan . |
| 53-34539 | 3/1978 | Japan . |
| 57-163213 | 10/1982 | Japan . |
| 58-4113 | 1/1983 | Japan . |
| 4-264412 | 9/1992 | Japan . |

*Primary Examiner*—Georgia Y. Epps
*Assistant Examiner*—Jordan M. Schwartz
*Attorney, Agent, or Firm*—Fitzpatrick, Cella, Harper & Scinto

[57] ABSTRACT

A zoom lens device including a total of five lens units which are in order of lens units from the lens unit closest to an object side, a first lens unit having a negative refractive power, a second lens unit having a positive refractive power, a third lens unit having a negative refractive power, a fourth lens unit having a positive refractive power, and a fifth lens unit having a positive refractive power. During magnification changes, the first, second, and fourth lens units move along the optical axis, while the third and fifth lens units are stationary. The zoom lens device satisfies the following conditions: (1) $0.7<f_2/f_T<1.2$; (2) $2.2<|f_3|/f_W<3.5$; (3) $0.6<|f_3|/f_4<1.45$; and (4) $f_T<f_4<f_5$, where fi represents the focal length of the ith lens unit, and $f_T$ and $f_W$ represent the focal lengths at the telephoto end and the wide angle end, respectively.

25 Claims, 10 Drawing Sheets

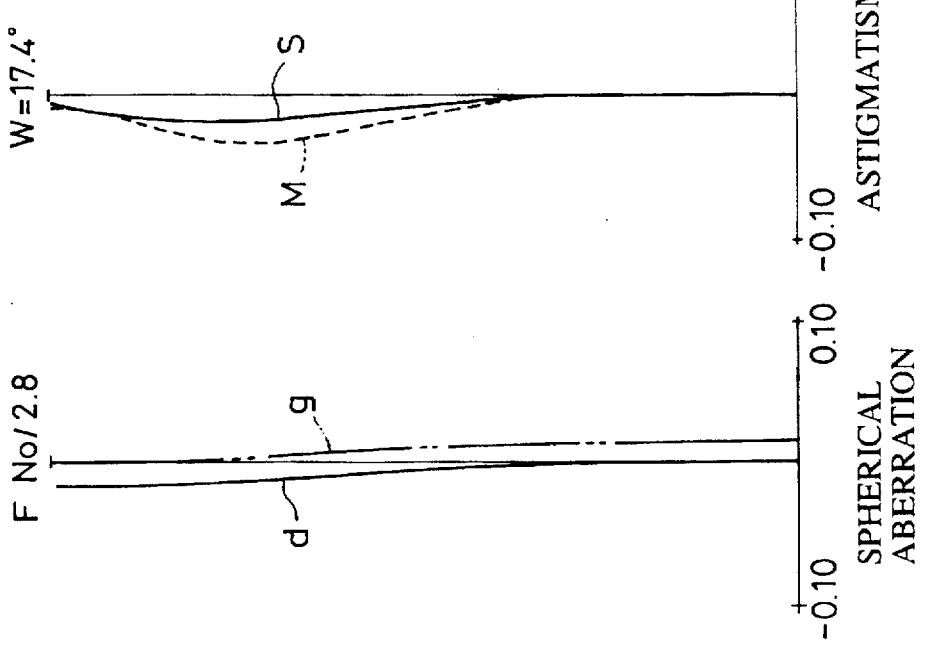

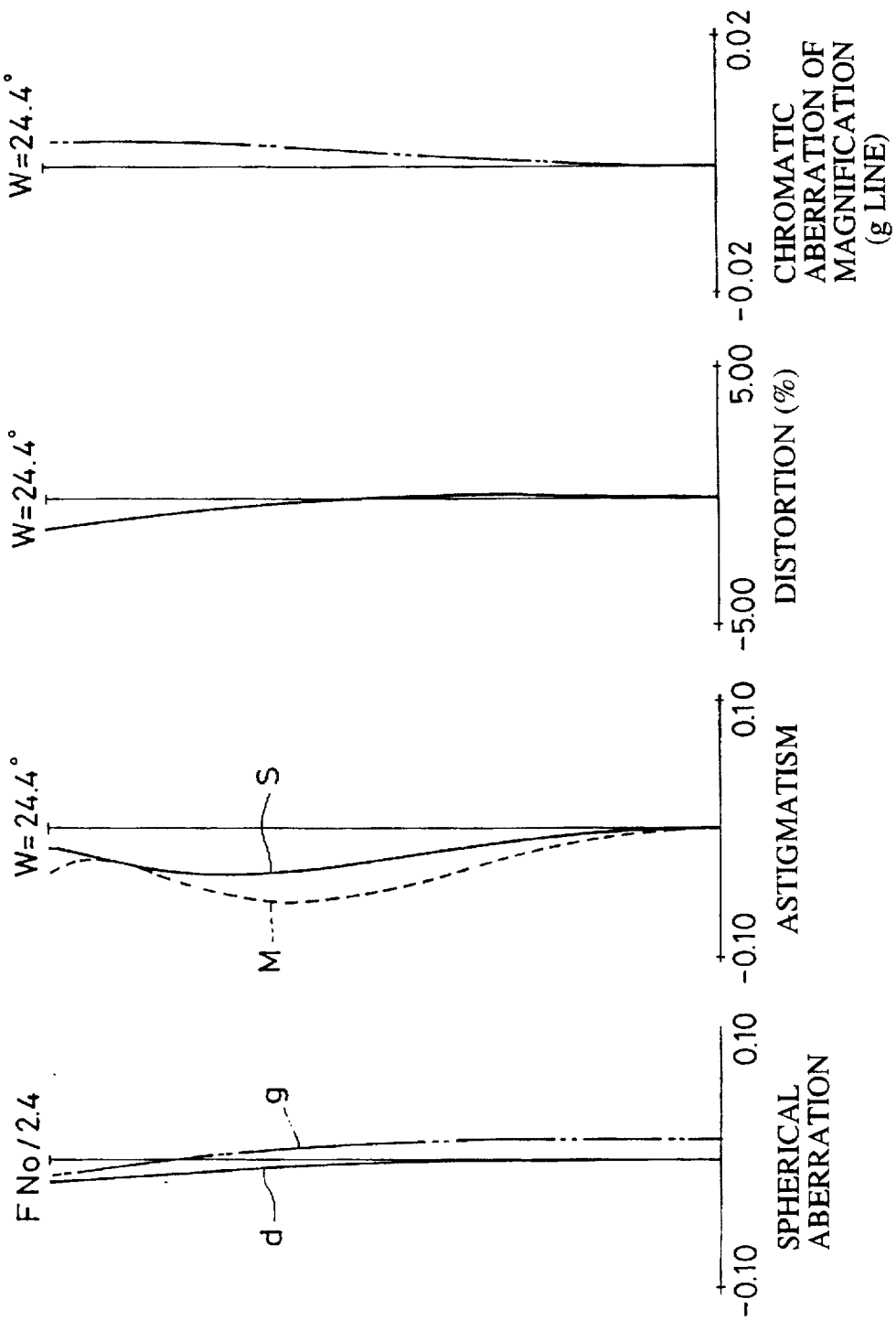

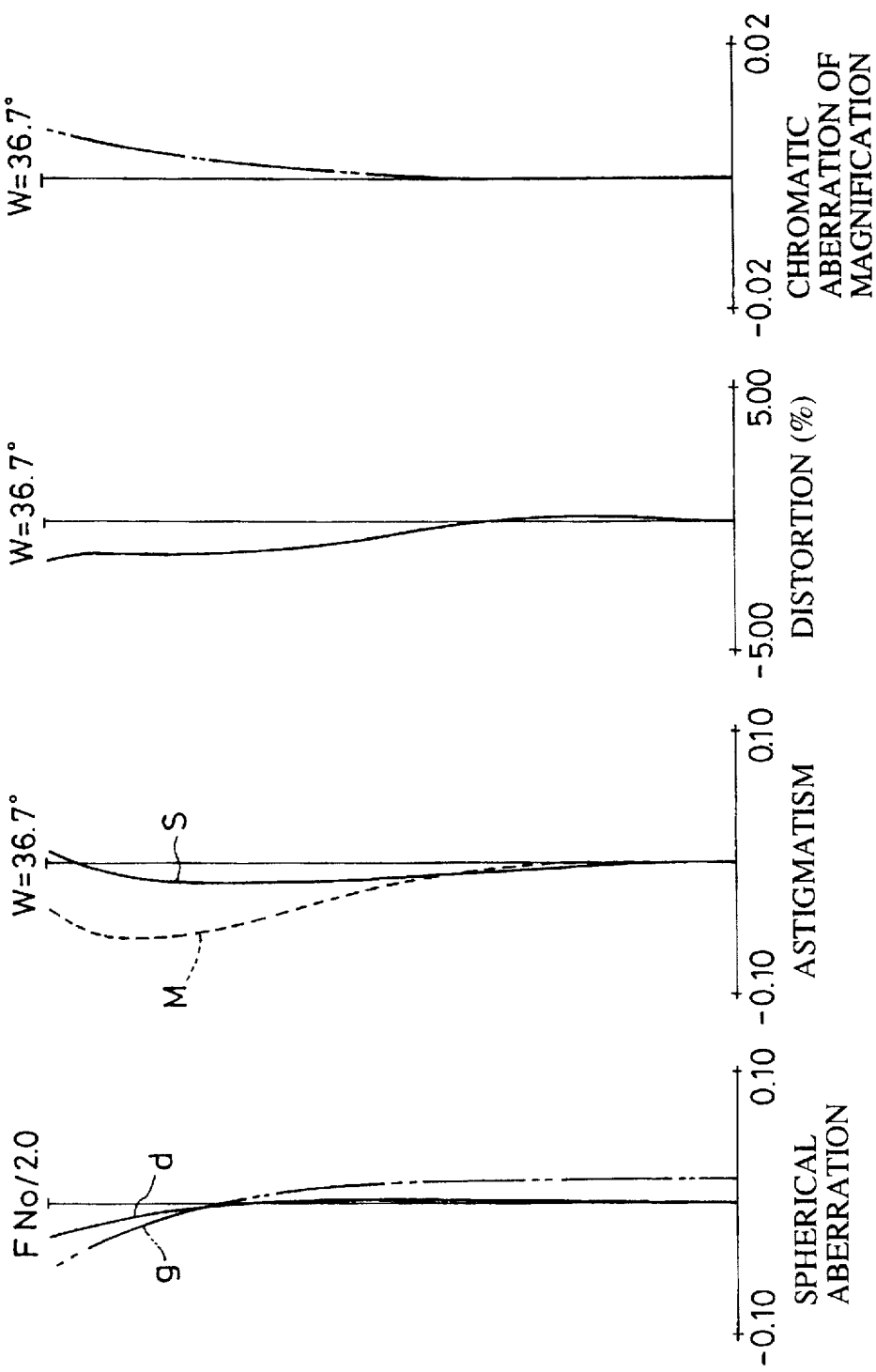

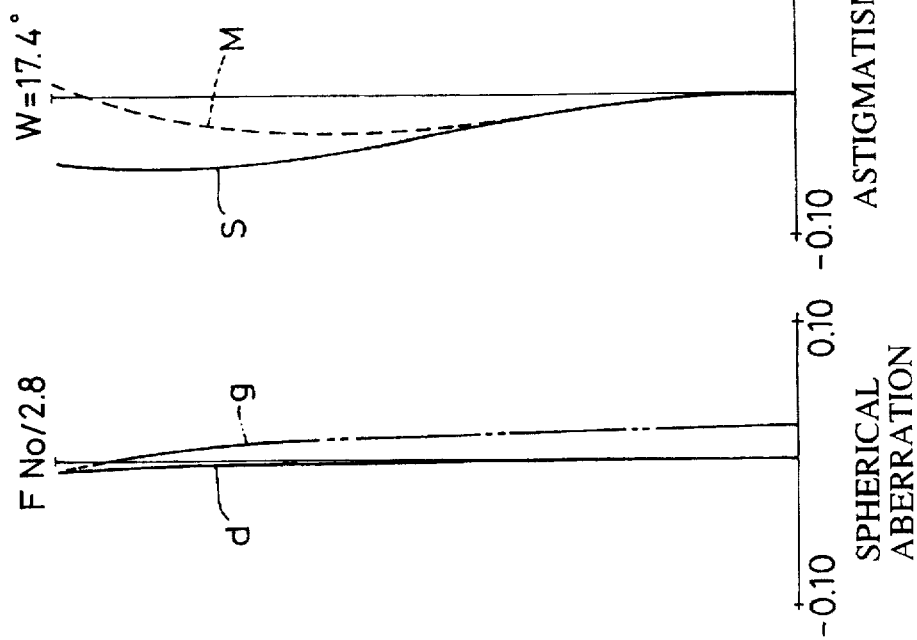

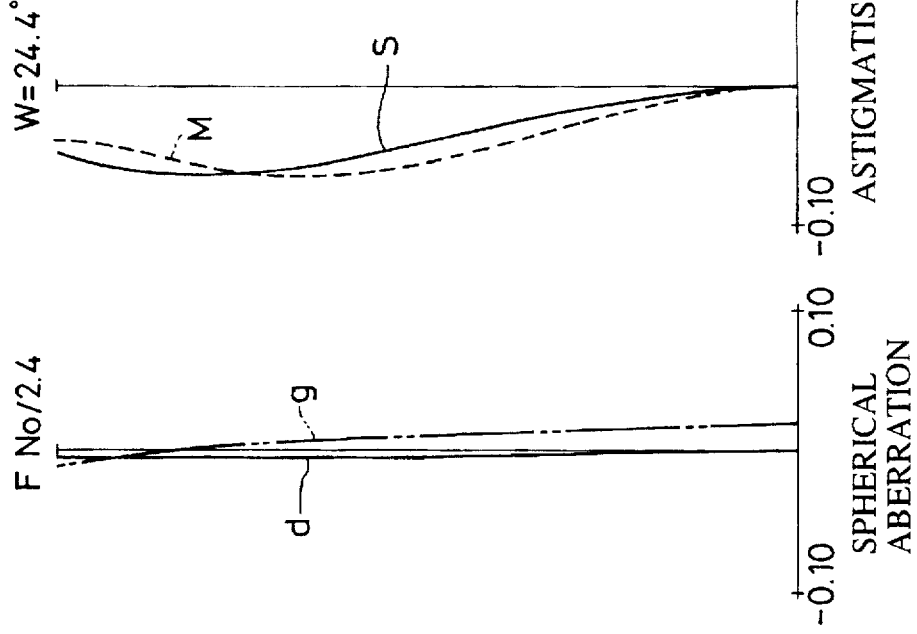

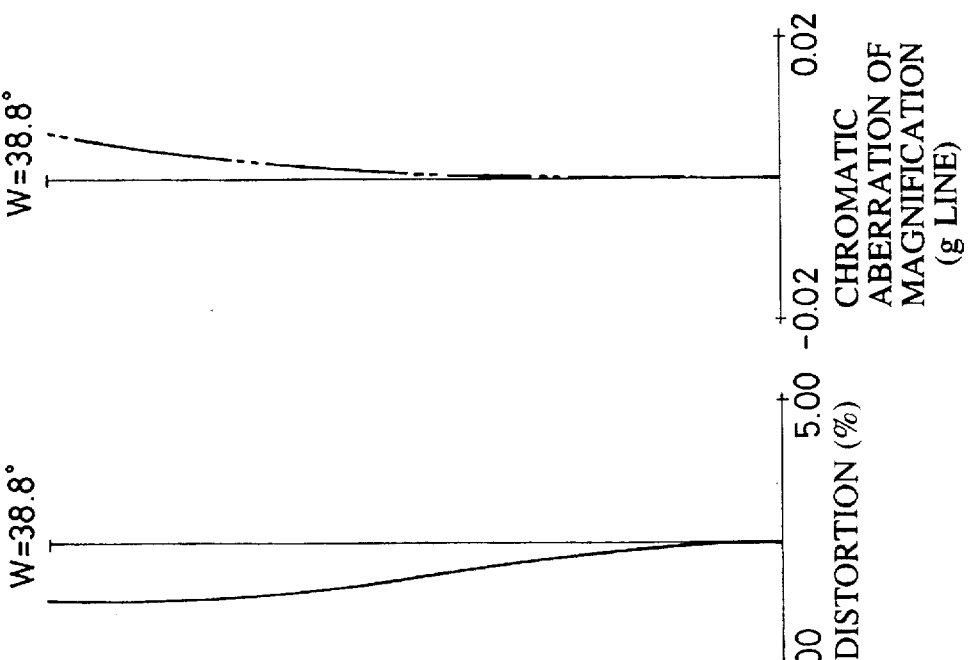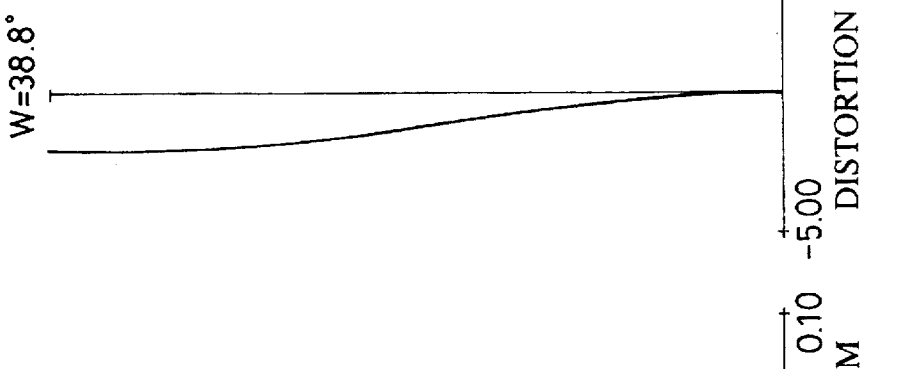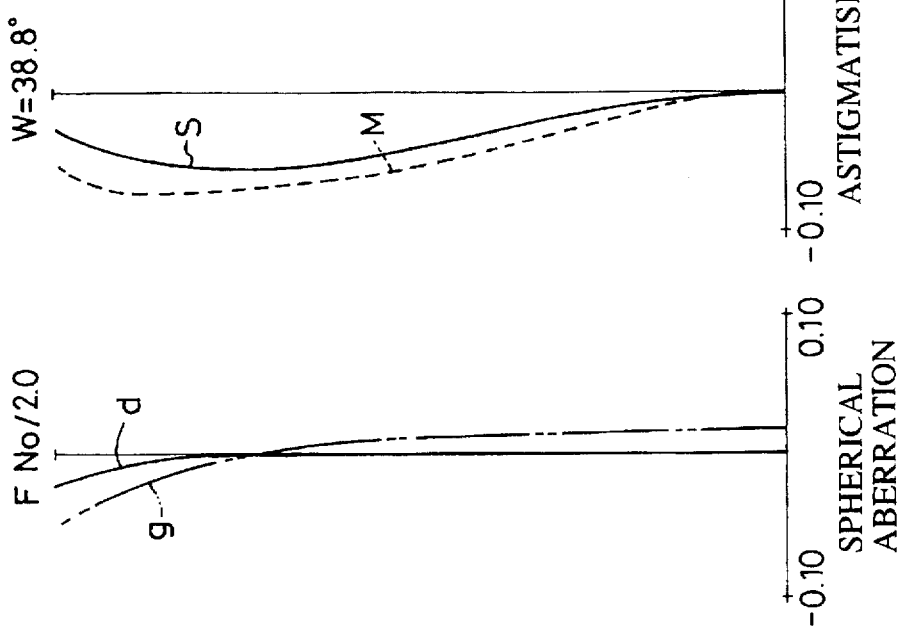

// 1

ZOOM LENS DEVICE WITH FIVE LENS UNITS

BACKGROUND OF THE INVENTION

1. Field of the Invention

The present invention broadly relates to a zoom lens device, and, more particularly, to a negative lead type zoom lens device having a wide angle of view and a long back focus, and which is substantially telecentric at an image plane side, and which is suitable for use in, for example, a video camera or a still video camera utilizing a solid-state imaging device.

2. Description of the Related Art

The so-called negative lead type zoom lens device in which a lens unit with a negative refractive power is placed at a leading position has the advantages that the angle of view can be made relatively wide easily and that the close shooting distance can be made short. However, this type of zoom lens device has the disadvantages that the stop diameter increases and that high magnification cannot be easily achieved.

Japanese Examined Patent Publication No. 49-23912, and Japanese Unexamined Patent Publication Nos. 53-34539, 57-163213, and 58-4113 disclose zoom lens devices free from the above-described problems, in which the entire lens system is made smaller and has high magnification.

The zoom lens devices disclosed in the above-described documents comprise four lens units whose refractive powers are, from the refractive power of the lens unit closest to the object side, negative, positive, negative, and positive. Among these lens units, a predetermined lens unit is properly moved in order to change magnification.

The zoom lens device disclosed in Japanese Unexamined Patent Publication No. 4-264412 comprises five lens units whose refractive powers are from the refractive power of the lens unit closest to the object side, positive, negative, positive, and negative. Among these lens units, a predetermined lens unit is properly moved in order to change magnification.

In recent years, there has been an increasing demand for video camera zoom lens devices which have high magnification and a wide angle of view. High magnifications of 10 times or more have been achieved as a result of progress made in design technology.

However, it has been difficult to provide a wide angle of view because the lens diameter, in particular the outer diameter of the front lens, cannot be easily reduced.

Similarly, in the still video camera field, there has also been an increasing demand for a zoom lens device providing a wide angle of view and having high resolution as a result of improvements made in imaging devices, such as charge coupled devices (CCDs) whose image pixels are closely compacted together.

These video cameras and still video cameras utilize solid-state imaging devices (CCDs), thus making it necessary to provide a lowpass filter, such as a crystal plate, or an infrared absorption filter between the optical system and the image plane. Therefore, the zoom lens devices used in these cameras must have a long back focus.

It is desirable that the zoom lens device be telecentric with respect to the CCD, since a color filter is provided in correspondence with the pixels of the CCD.

SUMMARY OF THE INVENTION

Accordingly, it is an object of the present invention to provide a substantially telecentric zoom lens device having a wide angle of view and high resolution, comprising a total of five lens units, wherein the refractive powers of predetermined lens units among the five lens units are properly set, so that sufficient back focus is provided to allow insertion of various filters, such as an optical lowpass filter or an infrared cut-off filter, and so that a principal ray incident to the imaging device, such as a CCD, is substantially perpendicular to the imaging device.

To this end, according to the present invention, there is provided a zoom lens device comprising five lens units which are in order of lens units from the lens unit closest to an object side, a first lens unit having a negative refractive power, a second lens unit having a positive refractive power, a third lens unit having a negative refractive power, a fourth lens having a positive refractive power, and a fifth lens unit having a positive refractive power. In the zoom lens device, during magnification changes, the first, second, and fourth lens units move along the optical axis, while the third and fifth lens units are stationary. The zoom lens device satisfies the following conditions:

$$0.7 < f_2/f_T < 1.2$$

$$2.2 < |f_3|/f_W < 3.5$$

$$0.6 < |f_3|/f_4 < 1.45$$

$$f_T < f_4 < f_5$$

where $f_i$ is the focal length of the ith lens unit, and $f_T$ and $f_W$ are the focal lengths of the entire lens system (i.e., the zoom lens device) at the telephoto end and the wide angle end, respectively.

In the zoom lens device, when the magnification changes from the telephoto end to the wide angle end, the second and fourth lens units move toward the image plane, with the second lens unit moving by a greater amount than the fourth lens unit. The fourth lens unit has at least one aspherical surface which is shaped so as to reduce the positive refractive power at a peripheral portion of the surface. The lens surface closest to the image plane side of the fourth lens unit is aspherically formed. The first lens unit has at least one aspherical surface which is shaped so as to reduce the positive refractive power at a peripheral portion of the surface. The lens surface closest to the object side of the first lens unit is aspherically formed.

In view of the foregoing, in one aspect, the present invention relates to a zoom lens device comprising, in order of lens units from the lens unit closest to an object side of the zoom lens device a first lens unit having a negative refractive power, a second lens unit having a positive refractive power, a third lens unit having a negative refractive power, a fourth lens unit having a positive refractive power, and a fifth lens unit having a positive refractive power, wherein during magnification change, the first lens unit, the second lens unit, and the fourth lens unit move along an optical axis of the zoom lens device, while the third lens unit and the fifth lens unit are stationary, and wherein the following conditions are satisfied:

$$0.7 < f_2/f_T < 1.2,$$

$$2.2 < |f_3|/f_W < 3.5,$$

$$0.6 < |f_3|/f_4 < 1.45, \text{ and}$$

$$f_T < f_4 < f_5,$$

where $f_2$, $f_3$, $f_4$, and $f_5$ represent the focal lengths of the second lens unit, the third lens unit, the fourth lens unit, and the fifth lens unit, respectively, and where $f_T$ and $f_W$ represent the focal lengths of the zoom lens device at a telephoto end and a wide-angle end, respectively.

In another aspect, the present invention relates to a zoom lens device comprising, in order of lens units from the lens unit closest to an object side of the zoom lens device a first lens unit having a negative refractive power, a second lens unit having a positive refractive power, a third lens unit having a negative refractive power, a fourth lens unit having a positive refractive power, and a fifth lens unit having a positive refractive power, wherein during magnification change, the first lens unit, the second lens unit, and the fourth lens unit move along an optical axis of the zoom lens device, while the third lens unit and the fifth lens unit are stationary, wherein the following conditions are satisfied:

$$0.7 < f_2/f_T < 1.2,$$

$$2.2 < |f_3|/f_W < 3.5,$$

$$0.6 < 5l\ f_3|/f_4 < 1.45, \text{ and}$$

$$f_T < f_4 < f_5,$$

where $f_2$, $f_3$, $f_4$, and $f_5$ represent the focal lengths of the second lens unit, the third lens unit, the fourth lens unit, and the fifth lens unit, respectively, and where $f_T$ and $f_W$ represent the focal lengths of the zoom lens device at a telephoto end and a wide-angle end, respectively, and wherein the first lens unit moves toward the object side and second lens unit and the fourth lens unit move toward an image plane side during magnification change from the telephoto end to the wide-angle end, the second lens unit moving by an amount larger than that of the fourth lens unit, wherein the first lens unit comprises, in order from the object side, a negative meniscus lens whose convex surface faces the object side, a negative lens, and a positive meniscus lens whose convex surface faces the object side, wherein the second lens unit comprises (i) a positive lens subunit consisting of a negative lens cemented to a positive lens and (ii) a positive meniscus lens, wherein the third lens unit comprises a negative lens subunit consisting of a positive lens cemented to a negative lens, wherein the fourth lens unit comprises (i) a lens subunit consisting of a negative lens cemented to a positive lens and (ii) a positive lens, and wherein the fifth lens unit comprises one of (i) a lens subunit consisting of a negative lens cemented to a positive lens and (ii) in order from the object side, a negative lens, a positive meniscus lens with its convex surface facing the image plane side, and a positive meniscus lens with its convex surface facing the object side.

These and other aspects, objects, and features of the present invention will become apparent from the following detailed description of preferred embodiments thereof taken in connection with the accompanying drawings.

BRIEF DESCRIPTION OF THE DRAWINGS

FIGS. 5A, 5B, 5C, and 5D illustrate diagrams showing the different aberrations at the telephoto end zoom position in Numerical Example 1 in accordance with the present invention.

FIGS. 6A, 6B, 6C, and 6D illustrate diagrams showing the different aberrations at an intermediate zoom position (i.e., between the telephoto end and wide angle end) in Numerical Example 1 in accordance with the present invention.

FIGS. 7A, 7B, 7C, and 7D illustrate diagrams showing the different aberrations at the wide angle end zoom position in Numerical Example 1 in accordance with the present invention.

FIGS. 8A, 8B, 8C, and 8D illustrate diagrams showing the different aberrations at the telephoto end zoom position in Numerical Example 2 in accordance with the present invention.

FIGS. 9A, 9B, 9C, and 9D illustrate diagrams showing the different aberrations at the intermediate zoom position in Numerical Example 2 in accordance with the present invention.

FIGS. 10A, 10B, 10C, and 10D illustrate diagrams showing the different aberrations at the wide angle end zoom position in Numerical Example 2 in accordance with the present invention.

DESCRIPTION OF THE PREFERRED EMBODIMENTS

Figure 1A:
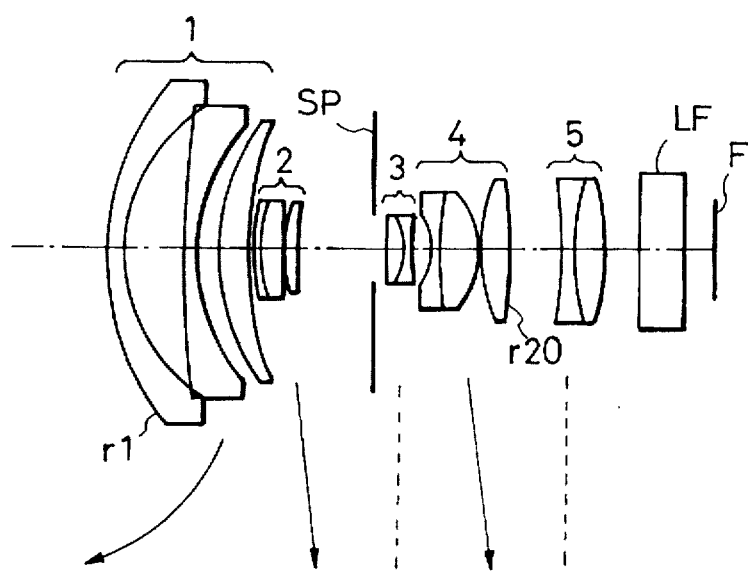
FIGS. 1A and 1B are sections of a zoom lens device of Embodiment 1 (Numerical Example 1) in accordance with the present invention.
Figure 1B:
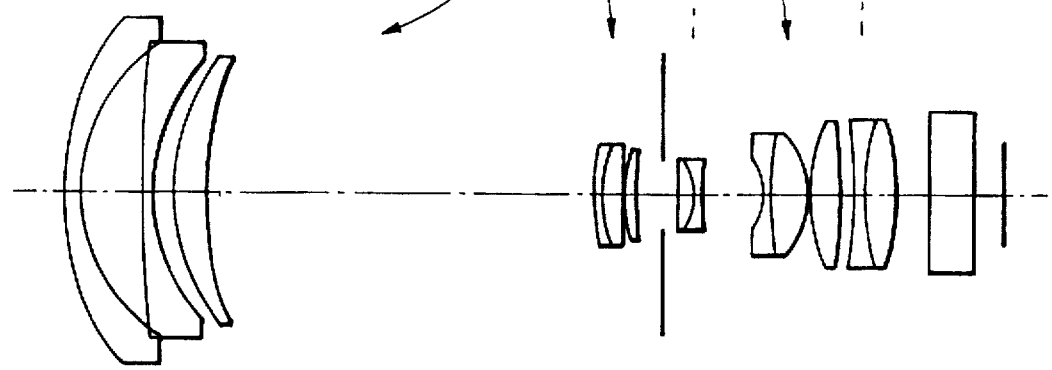

FIGS. 1A and 1B are sections of a zoom lens device of Embodiment 1 of the present invention at the telephoto end and at the wide angle end, respectively.

Referring to FIGS. 1A and 1B, reference numeral 1 denotes a first lens unit with a negative refractive power, which comprises in the order of lenses starting from the lens closest to the object side, a negative meniscus lens whose convex surface faces the object side, a negative lens, and a positive meniscus lens whose convex face faces the object side. Reference numeral 2 denotes a second lens unit with a positive refractive power. The second lens unit comprises (a) a positive lens subunit, consisting of a positive lens subunit formed by a negative lens cemented to a positive lens, and (b) a positive meniscus lens. Reference numeral 3 denotes a third lens unit with a negative refractive power, which comprises a negative lens subunit consisting of a positive lens cemented to a negative lens. Reference numeral 4 denotes a fourth lens unit with a positive refractive power. The fourth lens unit comprises a lens subunit (formed by a negative lens cemented to a positive lens) and a positive lens. Reference numeral 5 denotes a fifth lens unit (with a positive refractive power), which comprises a lens subunit formed by a negative lens cemented to a positive lens. SP denotes a stop, LF denotes an optical block such as a crystal plate, or an infrared absorption filter, and reference character F denotes an image plane. The ith lens surface from the object side is represented by ri.

Figures 2A, 2B:
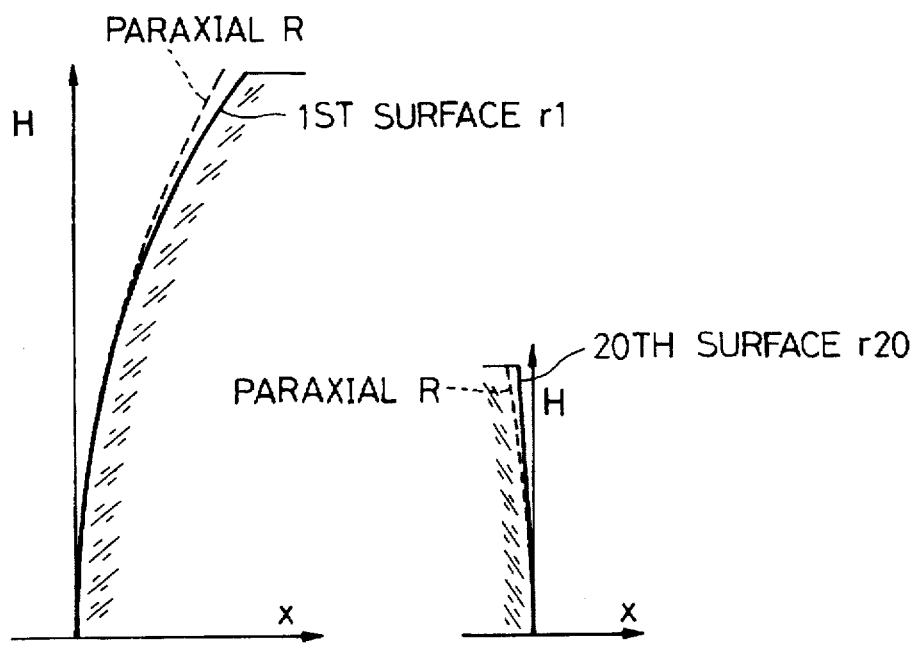
FIGS. 2A and 2B are sections each showing an aspherical surface of the zoom lens device of Embodiment 1 in accordance with the present invention.

Lens surface r1, closest to the object side, of the first lens unit and the lens surface r20, closest to the object side, of the fourth lens unit are aspherical. The aspherical surfaces are shown in FIGS. 2A and 2B, in which the solid line in each diagram represents a section of one side of the aspherically-shaped first surface (r1) and a section of one side of the aspherically-shaped 20th surface (r20), respectively, with respect to the optical axis, while the broken line in each diagram represents a paraxial spherical surface (R) with respect to the optical axis.

According to the present embodiment, the lens units, which move when the magnification changes from the telephoto end to the wide angle end, move as indicated by the arrows in FIGS. 1A and 1B. More specifically, the first lens unit moves toward the object, the second lens unit moves toward the image plane, and the fourth lens unit moves toward the image plane. The third and fifth lens units are stationary.

According to the present embodiment, there are five lens units whose refractive powers are from the refractive power of the lens unit closest to the object side, negative, positive, negative, positive, and positive. The refractive powers of the second, third, fourth, and fifth lens units are set so as to satisfy the following Conditions (1) to (4):

$$0.7 < f_2/f_T < 1.2 \quad (1)$$

$$2.2 < |f_3|/f_W < 3.5 \quad (2)$$

$$0.6 < |f_3|/f_4 < 1.45 \quad (3)$$

$$f_T < f_4 < f_5 \quad (4)$$

Therefore, it is possible to provide a zoom lens device with a long back focus, which is substantially telecentric with respect to the image plane, has a wide angle of view, and provides excellent optical performance.

Figure 3A:
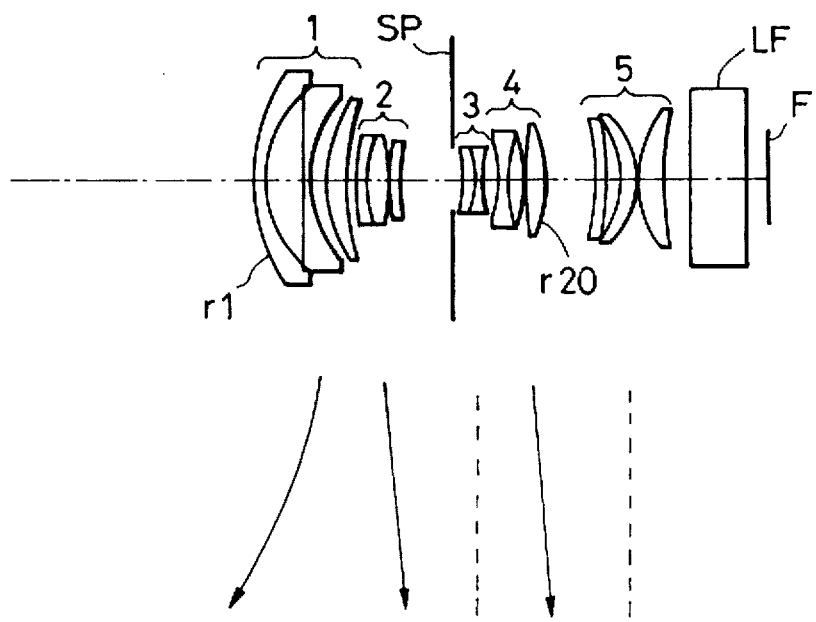
FIGS. 3A and 3B are sections of a zoom lens device of Embodiment 2 (Numerical Example 2) in accordance with the present invention.
Figure 3B:
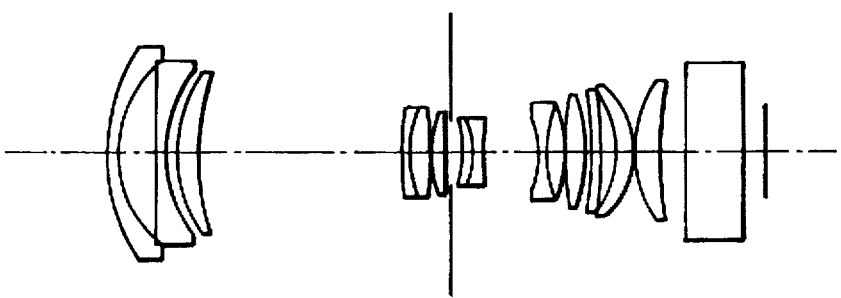

FIGS. 3A and 3B are sections of a zoom lens device of Embodiment 2 of the present invention at the telephoto end and the wide angle end, respectively.

The zoom lens device of the present embodiment is essentially the same as the zoom lens device of Embodiment 1, except for the construction of the fifth lens unit. The fifth lens unit comprises in the order of lenses from the lens closest to the object side, a negative lens, a positive meniscus lens with its convex surface facing the image plane, and a positive meniscus lens with its convex surface facing the object.

Figures 4A, 4B:
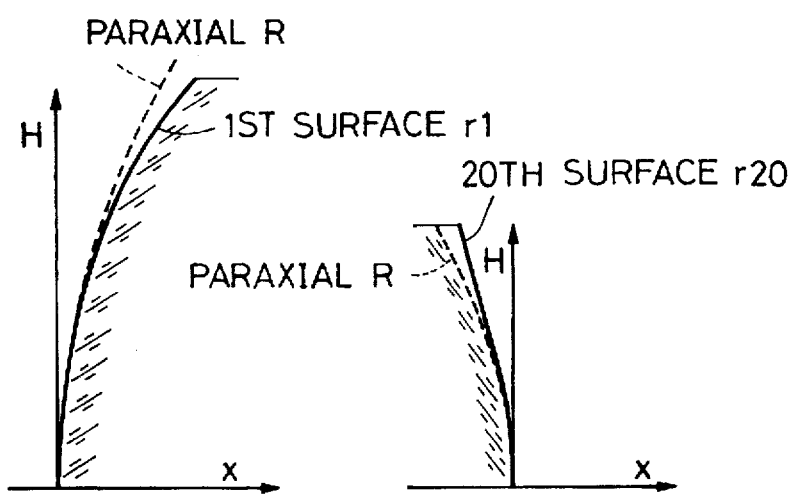
FIGS. 4A and 4B are sections each showing an aspherical surface of the zoom lens device of Embodiment 2 in accordance with the present invention.

In the present embodiment, the first lens surface r1 and the 20th lens surface r20 are aspherical. These aspherical surfaces are shown in the diagrams of FIGS. 4A and 4B, in which the solid line in each diagram represents a section of one side of the aspherically-shaped first surface (r1) and one side of the aspherically-shaped 20th surface (r20), respectively, with respect to the optical axis, and the broken line in each diagram represents a section of a paraxial spherical surface (R) with respect to the optical axis.

According to the present embodiment, the lens units, which move when the magnification changes from the telephoto end to the wide angle end, move as indicated by the arrows in FIGS. 3A and 3B. More specifically, the first lens unit moves toward the object, and the second lens unit and the fourth lens unit move toward the image plane. The third and fifth lens units are stationary.

According to the present embodiment, there are five lens units whose refractive powers are from the refractive power of the lens unit closest to the object side, negative, positive, negative, positive, and positive. The refractive powers of the second, third, fourth, and fifth lens units are set so as to satisfy Conditions (1) to (4), so that the zoom lens device is one having a long back focus, which is substantially telecentric with respect to the image plane, has a wide angle of view, and provides excellent optical performance.

The technical meaning of each of the aforementioned conditions will be given.

Condition (1) relates to the positive refractive power of the second lens unit. Satisfying this condition primarily results in a shorter overall length of the lens unit and proper correction of spherical aberration at the telephoto end. More specifically, when the $f_2/f_T$ value of the second lens unit, which plays the most part in changing the magnification in the zoom lens device construction, is less than the lower limit so that it has a high positive refractive power, the spherical aberration which is in particular large at the telephoto end cannot be corrected by the other lens units. On the other hand, when the $f_2/f_T$ value of the second lens unit is greater than the upper limit of Condition (1), the lens unit must be moved by a larger amount in order to perform the predetermined magnification changes, resulting in a longer overall length of the zoom lens device, and a larger outside diameter of the first lens unit.

Condition (2) relates to the negative refractive power of the third lens unit. Satisfying this condition primarily causes the zoom lens device as a whole to be a substantially telecentric optical system. Considering the characteristics of the zoom lens device of the present invention, it is desirable to use a telecentric lens system when, for example, an imaging device is used. With Conditions (1) and (3) set as described above, Condition (2) allows the proper back focus to be provided in order to make the zoom lens device into a substantially telecentric system. Without Condition (2) being satisfied, it becomes difficult to form the zoom lens device into a telecentric system.

Condition (3) relates to the ratio of the refractive powers of the third and fourth lens units. When this condition is satisfied, a proper back focus can be ensured to form the zoom lens device into a nearly telecentric system, and astigmatism which occurs at the fourth lens unit can be properly controlled.

Condition (4) relates to the ratio of the fourth and fifth lens units. Satisfying this condition primarily results in proper setting of the amount of movement of the fourth lens unit and proper correction of the various aberrations. When the fourth lens unit, which is moved to change the magnification, has a high positive refractive power, the fourth lens unit does not have to be moved by a large amount, thus reducing the size of the zoom lens device. However, variations in the various aberrations resulting from magnification changes are increased by an amount which cannot be corrected by the other lens units.

According to the present embodiments of the present invention, the first lens unit has an aspherical surface which primarily corrects astigmatism and distortion which are difficult to correct at the wide angle side, so that changes in distortions are kept to a minimum over the entire zoom lens unit.

More specifically, the lens surface closest to the object, that is the first surface r1, where the point of passage of the nonaxial light beam changes the most between the telephoto side and the wide angle side, is made aspherical. The aspherical surface is shaped so as to increase the positive refractive power at a peripheral portion thereof.

In addition, according to the present embodiments of the present invention, the fourth lens unit has an aspherical surface shaped as described above to properly correct astigmatism which occurs over the entire zoom lens device. More specifically, the lens surface of the fourth lens unit which is closest to the image, that is the 20th surface r20, where the point of passage of the nonaxial light beam changes the most between the telephoto side and the wide angle side, is made aspherical. The aspherical surface is shaped so as to reduce the positive refractive power at a peripheral portion thereof.

It was believed to be difficult to correct astigmatism and distortion which occur, in particular, at the peripheral portions of the screen and to provide high optical performance in a zoom lens device having a wide angle of view and a long back focus. The present invention makes it possible to satisfactorily correct spherical aberration, coma, and astigmatism occurring over the entire zoom lens device, as well as distortion occurring particularly at the wide angle side by forming a surface of the fourth lens unit into an aspherical surface to reduce positive refractive power at the surface peripheral portions.

When a surface of the first lens unit is formed into an aspherical shape, it is possible to correct astigmatism, which is corrected more than is necessary over the entire zoom lens device when an attempt is made to properly correct spherical aberration and coma, and to correct distortion, as it is corrected by the aspherical surface of the fourth lens unit, which is insufficiently corrected at the wide angle side.

According to the present embodiments, the second and fourth lens units move toward the image plane when the magnification changes from the telephoto end to the wide angle end, with the second lens unit moving by a larger amount than the fourth lens unit, as a result of which changes in the various aberrations occurring due to magnification changes are canceled.

A description will now be given of the numerical examples of the present invention. In the numerical examples, ri represents the radius of curvature of an ith lens surface from the object side; di represents the distance from the ith lens surface to the i+1th lens surface from the object side; and ni and vi represent the index of refraction and the Abbe constant, respectively, of the material of the ith lens from the object side. The stop is considered as one planar surface in the numerical examples.

The aspherical shape of the surface is defined by the following formula:

$$x = \frac{(1/ri)H^2}{1 + \{1 - (H/ri)^2\}^{1/2}} + AH^2 + BH^4 + CH^6 + DH^8 + EH^{10} +$$

$$A'H^3 + B'H^5 + C'H^7 + D'H^9 + E'H^{11}$$

where the x-axis extends along the optical axis, the H-axis (with only positive values) extends along a direction perpendicular to the optical axis, the direction of travel of light is defined as positive, ri represents the paraxial radius of curvature (paraxial R), and A, B, C, D, and E, and A', B', C', D', and E' each represent aspherical coefficients. In addition, e-X represents $10^{-X}$.

NUMERICAL EXAMPLE 1

The zoom lens device of Numerical Example 1 has a magnification change-over ratio of 2.38.

| f = 14.68~6.19 | FNo = 1:2.8~2.0 | 2ω = 34.8°~73.4° | |
|---|---|---|---|
| r1 = 30.093 | d1 = 1.10 | n1 = 1.74320 | v1 = 49.3 |
| r2 = 15.866 | d2 = 6.05 | | |
| r3 = 123.092 | d3 = 1.00 | n2 = 1.77250 | v2 = 49.6 |
| r4 = 18.627 | d4 = 2.13 | | |
| r5 = 21.219 | d5 = 2.80 | n3 = 1.84666 | v3 = 23.8 |
| r6 = 36.029 | d6 = varies | | |
| r7 = 21.472 | d7 = 0.70 | n4 = 1.84666 | v4 = 23.8 |
| r8 = 12.223 | d8 = 2.00 | n5 = 1.77250 | v5 = 49.6 |
| r9 = 560.166 | d9 = 0.10 | | |
| r10 = 17.272 | d10 = 1.30 | n6 = 1.80400 | v6 = 46.6 |
| r11 = 75.829 | d11 = varies | | |
| r12 = (stop) | d12 = 1.30 | | |
| r13 = −44.705 | d13 = 1.50 | n7 = 1.80518 | v7 = 25.4 |
| r14 = −6.706 | d14 = 0.60 | n8 = 1.72342 | v8 = 38.0 |
| r15 = 16.210 | d15 = varies | | |
| r16 = −5.952 | d16 = 0.60 | n9 = 1.80518 | v9 = 25.4 |
| r17 = 33.624 | d17 = 3.50 | n10 = 1.77250 | v10 = 49.6 |
| r18 = −8.583 | d18 = 0.10 | | |
| r19 = 16.058 | d19 = 2.80 | n11 = 1.74320 | v11 = 49.3 |
| r20 = −38.957 | d20 = varies | | |

-continued

| f = 14.68~6.19 | FNo = 1:2.8~2.0 | 2ω = 34.8°~73.4° | |
|---|---|---|---|
| r21 = −40.677 | d21 = 0.80 | n12 = 1.62004 | v12 = 36.3 |
| r22 = 24.335 | d22 = 2.90 | n13 = 1.77250 | v13 = 49.6 |
| r23 = −25.006 | d23 = 3.00 | | |
| r24 = 0.000 | d24 = 4.10 | n14 = 1.51633 | v14 = 64.2 |
| r25 = 0.000 | | | |
| back focus 9.93 | | | |

(Retrofocus ratio with respect to focal length at wide angle end 1.605)

Variation Interval Data

| Focal length | 14.68 | 10.17 | 6.19 |
|---|---|---|---|
| d6 | 0.32 | 11.35 | 35.21 |
| d11 | 6.91 | 4.39 | 2.31 |
| d15 | 2.10 | 4.19 | 5.90 |
| d20 | 5.20 | 3.12 | 1.40 |

Amount of Lens Unit Movement

| Focal length | 14.68 | 10.17 | 6.19 |
|---|---|---|---|
| 1st Lens Unit | 0.0 | −8.51 | −30.29 |
| 2nd Lens Unit | 0.0 | 2.52 | 4.60 |
| 4th Lens Unit | 0.0 | 2.09 | 3.80 |

Distance from Image Plane to Exit Pupil

| Focal length | 14.68 | 10.17 | 6.19 |
|---|---|---|---|
| Pupil Distance | 185.8 | 124.0 | 55.3 |

Aspherical Coefficients in Numerical Example 1

| 1st surface | 20th surface |
|---|---|
| A = 0 | A = 0 |
| B = 2.38906e-5 | B = 1.30197e-4 |
| C = 1.24735e-7 | C = −2.2072e-7 |
| D = −3.7749e-10 | D = −3.82378e-8 |
| E = 9.79614e-13 | E = 2.87962e-10 |
| A' = 0 | A' = 0 |
| B' = −2.67954e-6 | B' = −7.61226e-6 |
| C' = 6.50446e-9 | C' = 4.00208e-7 |
| D' = −1.56913e-11 | D' = −2.04102e-9 |
| E' = 0 | E' = 0 |

| Shape of 1st surface | | | Shape of 20th surface | | |
|---|---|---|---|---|---|
| H | x | xr(paraxial R) | H | x | xr(paraxial R) |
| 0.0 | 0.00000 | 0.00000 | 0.0 | 0.00000 | 0.00000 |
| 1.0 | 0.01664 | 0.01662 | 1.0 | −0.01271 | −0.01284 |
| 2.0 | 0.06684 | 0.06653 | 2.0 | −0.04951 | −0.05137 |
| 3.0 | 0.15130 | 0.14991 | 3.0 | −0.10655 | −0.11568 |
| 4.0 | 0.27099 | 0.26703 | 4.0 | −0.17745 | −0.20590 |
| 5.0 | 0.42713 | 0.41829 | 5.0 | −0.25291 | −0.32220 |
| 6.0 | 0.62125 | 0.60421 | 6.0 | −0.32093 | −0.46482 |
| 7.0 | 0.85529 | 0.82546 | 7.0 | −0.36723 | −0.63406 |
| 8.0 | 1.13186 | 1.08285 | | | |
| 9.0 | 1.45436 | 1.37735 | | | |
| 10.0 | 1.82719 | 1.71011 | | | |
| 11.0 | 2.25595 | 2.08249 | | | |
| 12.0 | 2.74755 | 2.49610 | | | |
| 13.0 | 3.31122 | 2.95283 | | | |
| 14.0 | 3.95847 | 3.45489 | | | |
| 15.0 | 4.70595 | 4.00491 | | | |

FIGS. 1A to 1B are sections of Numerical Example 1. FIGS. 5a to 7D are each diagrams showing the different aberrations at the telephoto end zoom position, the intermediate zoom position, and the wide angle end zoom position, respectively.

In the diagrams (FIGS. 5A through 10D), d stands for the spectral d-line, g for the spectral g-line, M for the meridional image focus, and S for the sagittal image focus.

The back focus in Numerical Example 1 is 8.53 (as measured from the 23rd surface to the image plane in terms of air), which is 1.378 times the focal length at the wide angle end and thus which is large enough to provide space for a crystal plate or an infrared absorption filter.

The distances from the image plane to the exit pupil are as given in the table, which are large enough to make the optical system into a substantially telecentric system.

At any zoom position in Numerical Example 1, spherical aberration and astigmatism are small, distortion is at most 1.5%, and chromatic aberration of magnification is less than 0.006, so that the zoom lens device provides excellent optical performance.

NUMERICAL EXAMPLE 2

The zoom lens device of Numerical Example 2 has a magnification change-over ratio of 2.37.

| f = 14.00~5.90 | FNo = 1:2.8~2.0 | 2ω = 34.8°~73.6° | |
|---|---|---|---|
| r1 = 22.492 | d1 = 0.80 | n1 = 1.74320 | v1 = 49.3 |
| r2 = 11.236 | d2 = 3.40 | | |
| r3 = 469.614 | d3 = 0.80 | n2 = 1.74320 | v2 = 49.3 |
| r4 = 12.570 | d4 = 1.25 | | |
| r5 = 14.433 | d5 = 1.89 | n3 = 1.80518 | v3 = 25.4 |
| r6 = 28.160 | d6 = varies | | |
| r7 = 22.279 | d7 = 0.80 | n4 = 1.84666 | v4 = 23.8 |
| r8 = 10.752 | d8 = 1.90 | n5 = 1.77250 | v5 = 49.6 |
| r9 = −35.126 | d9 = 0.10 | | |
| r10 = 11.879 | d10 = 1.20 | n6 = 1.77250 | v6 = 49.6 |
| r11 = 37.124 | d11 = varies | | |
| r12 = (stop) | d12 = 1.00 | | |
| r13 = −16.164 | d13 = 1.20 | n7 = 1.84666 | v7 = 23.8 |
| r14 = −7.722 | d14 = 0.70 | n8 = 1.56757 | v8 = 58.4 |
| r15 = 10.696 | d15 = varies | | |
| r16 = −10.106 | d16 = 0.70 | n9 = 1.84666 | v9 = 25.8 |
| r17 = 16.408 | d17 = 1.60 | n10 = 1.77250 | v10 = 49.6 |
| r18 = −17.585 | d18 = 0.10 | | |
| r19 = 30.283 | d19 = 1.80 | n11 = 1.74320 | v11 = 49.3 |
| r20 = −13.325 | d20 = varies | | |
| r21 = −24.418 | d21 = 0.80 | n12 = 1.80518 | v12 = 25.4 |
| r22 = −52.777 | d22 = 1.40 | | |
| r23 = −9.666 | d23 = 1.50 | n13 = 1.69680 | v13 = 55.5 |
| r24 = −8.474 | d24 = 0.10 | | |
| r25 = 11.918 | d25 = 2.20 | n14 = 1.69680 | v14 = 55.5 |
| r26 = 40.575 | d26 = 2.20 | | |
| r27 = 0.000 | d27 = 5.00 | n15 = 1.51633 | v15 = 64.2 |
| r28 = 0.000 | | | |

Back focus 9.33
(Retrofocus ratio with respect to focal length at wide angle end 1.583)

Variation Interval Data

| Focal length | 14.00 | 9.54 | 5.90 |
|---|---|---|---|
| d6 | 0.80 | 6.54 | 18.17 |
| d11 | 4.74 | 2.44 | 0.54 |
| d15 | 1.42 | 3.64 | 5.47 |
| d20 | 4.72 | 2.50 | 0.68 |

Amount of Lens Unit Movement

| Focal length | 14.00 | 9.54 | 5.90 |
|---|---|---|---|
| 1st Lens Unit | 0.0 | −3.44 | −13.17 |
| 2nd Lens Unit | 0.0 | 2.30 | 4.20 |
| 4th Lens Unit | 0.0 | 2.22 | 4.05 |

Distance from Image Plane to Exit Pupil

| Focal length | 14.00 | 9.54 | 5.90 |
|---|---|---|---|
| Pupil Distance | 210.8 | 161.8 | 61.7 |

| Aspherical Coefficients in Numerical Example 2 | |
|---|---|
| 1st surface | 20th surface |
| A = 0 | A = 0 |
| B = 3.8344e-5 | B = 1.94349e-4 |
| C = 1.99462e-8 | C = −3.07401e-6 |
| D = 9.0222e-10 | D = −2.67122e-8 |
| E = 0 | E = 0 |
| A' = 0 | A' = 0 |
| B' = 0 | B' = 0 |
| C' = 0 | C' = 0 |
| D' = 0 | D' = 0 |
| E' = 0 | E' = 0 |

| Shape of 1st surface | | | Shape of 20th surface | | |
|---|---|---|---|---|---|
| H | x | xr(paraxial R) | H | x | xr(paraxial R) |
| 0.0 | 0.00000 | 0.00000 | 0.0 | 0.00000 | 0.00000 |
| 1.0 | 0.02228 | 0.02224 | 1.0 | −0.03738 | −0.03758 |
| 2.0 | 0.08971 | 0.08910 | 2.0 | −0.14765 | −0.15095 |
| 3.0 | 0.20410 | 0.20097 | 3.0 | −0.32429 | −0.34210 |
| 4.0 | 0.36850 | 0.35854 | 4.0 | −0.55395 | −0.61455 |
| 5.0 | 0.58742 | 0.56279 | 5.0 | −0.81459 | −0.97366 |
| 6.0 | 0.86719 | 0.81505 | 6.0 | −1.07685 | −1.42728 |
| 7.0 | 1.21662 | 1.11701 | 7.0 | −1.31247 | −1.98676 |
| 8.0 | 1.64824 | 1.47082 | | | |
| 9.0 | 2.18015 | 1.87914 | | | |
| 10.0 | 2.83889 | 2.34529 | | | |
| 11.0 | 3.66351 | 2.87338 | | | |
| 12.0 | 4.71119 | 3.46859 | | | |
| 13.0 | 6.06482 | 4.13743 | | | |
| 14.0 | 7.84300 | 4.88834 | | | |
| 15.0 | 10.21288 | 5.73222 | | | |
| 16.0 | 13.40665 | 6.68409 | | | |
| 17.0 | 17.74246 | 7.76481 | | | |
| 18.0 | 23.65138 | 9.00534 | | | |
| 19.0 | 31.71330 | 10.45497 | | | |
| 20.0 | 42.71014 | 12.20171 | | | |

FIGS. 3A and 3B are sections of Numerical Example 2. FIGS. 8A to 10D are diagrams showing the different aberrations at the telephoto end zoom position, intermediate zoom position, and wide angle end zoom position in Numerical Example 2, respectively.

The back focus in Numerical Example 2 is 7.63 (as measured from the 26th surface to the image plane in terms of air), which is 1.293 times the focal length at the wide angle end, and which is thus large enough to provide space for a crystal plate or an infrared absorption filter.

The distances from the image plane to the exit pupil are as given in the table, which are large enough to make the optical system into a substantially telecentric system.

At any zoom position in Numerical Example 2, the spherical aberration is small, astigmatism is less than 0.075, distortion is 2% at most, and chromatic aberration of magnification is less than 0.0075, so that the zoom lens device provides excellent optical performance.

Numerical values for the aforementioned conditions for each of the numerical examples are given below.

| | | Numerical Example 1 | Numerical Example 2 |
|---|---|---|---|
| Condition (1) | $0.7 < f_2/f_T < 1.2$ | 1.014 | 0.748 |
| Condition (2) | $2.2 < f_3/f_W < 3.5$ | 3.168 | 2.413 |
| Condition (3) | $0.6 < |f_3|/f_4 < 1.45$ | 1.307 | 0.722 |

-continued

|  |  | Numerical Example 1 | Numerical Example 2 |
|---|---|---|---|
| Condition (4) | $f_T < f_4 < f_5$ | 14.8 < 15 <44.16 | 14 < 19.7 <21.06 |

The focal lengths at the wide angle end and telephoto end, and the focal lengths of the lens units are given in the following table.

|  | Numerical Example 1 | Numerical Example 2 |
|---|---|---|
| $f_W$ | 6.187 | 5.9 |
| $f_T$ | 14.80 | 14.0 |
| $f_1$ | −24.499 | −15.797 |
| $f_2$ | 15.0 | 10.472 |
| $f_3$ | −19.6 | −14.238 |
| $f_4$ | 15.0 | 19.727 |
| $f_5$ | 44.159 | 21.056 |

Though in the numerical examples, the surface closest to the object in the first lens unit and the surface closest to the image in the fourth lens unit are formed aspherically, any other surface in the first lens unit and any other surface in the fourth lens unit may be formed aspherically, in order to substantially achieve the object of the present invention.

By virtue of the above-described construction in which predetermined lens units among the five lens units have their refractive powers properly set with respect to each other, it is possible to provide a telecentric zoom lens device with a wide angle of view and high resolution, which has sufficient back focus allowing insertion of various filters such as optical lowpass filters or infrared cut-off filters, and which allows a principal light beam incident to an imaging device, such as a CCD, to be directed substantially perpendicular to the imaging device.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A zoom lens device comprising, in order of lens units from the lens unit closest to an object side of said zoom lens device:

a first lens unit having a negative refractive power;
   a second lens unit having a positive refractive power;
   a third lens unit having a negative refractive power;
   a fourth lens unit having a positive refractive power; and
   a fifth lens unit having a positive refractive power;
   wherein during magnification change, said first lens unit, said second lens unit, and said fourth lens unit move along an optical axis of said zoom lens device, while said third lens unit and said fifth lens unit are stationary, and
   wherein the following conditions are satisfied:

$0.7 < f_2/f_T < 1.2$, $2.2 < |f_3|/f_W < 3.5$, $0.6 < |f_3|/f_4 < 1.45$, and $f_T < f_4 < f_5$, where $f_2$, $f_3$, $f_4$, and $f_5$ represent the focal lengths of said second lens unit, said third lens unit, said fourth lens unit, and said fifth lens unit, respectively, and where $f_T$ and $f_W$ represent the focal lengths of said zoom lens device at a telephoto end and a wide-angle end, respectively.

2. A zoom lens device according to claim 1, wherein said second lens unit and said fourth lens unit move toward an image plane side during magnification changes from the telephoto end to the wide-angle end, said second lens unit moving by a larger amount than that of said fourth lens unit.

3. A zoom lens device according to claim 1 or claim 2, wherein said fourth lens unit has at least one aspherical surface which is shaped so as to reduce a positive refractive power at a peripheral portion of the surface.

4. A zoom lens device according to claim 3, wherein a lens surface of said fourth lens unit which is closest to the image plane side is aspherically formed.

5. A zoom lens device according to claims 1 or 2, wherein said first lens unit has at least one aspherical surface which is shaped so as to increase a positive refractive power at a peripheral portion of the surface.

6. A zoom lens device according to claim 5, wherein a lens surface of said first lens unit which is closest to the object side is aspherically formed.

7. A zoom lens device according to claims 1 or 2, wherein said fourth lens unit has at least one aspherical surface which is shaped so as to reduce a positive refractive power at a peripheral portion of the surface, and wherein said first lens unit has at least one aspherical surface which is shaped so as to increase a positive refractive power at a peripheral portion of the surface.

8. A zoom lens device according to claim 7, wherein a lens surface of said fourth lens unit which is closest to the image plane side is aspherically formed, and wherein a lens surface of said first lens unit which is closest to the object side is aspherically formed.

9. A zoom lens device according to claim 1, wherein said first lens unit comprises, in order from the object side, a negative meniscus lens whose convex surface faces the object side, a negative lens, and a positive meniscus lens whose convex surface faces the object side.

10. A zoom lens device according to claim 1, wherein said second lens unit comprises (i) a positive lens subunit consisting of a negative lens cemented to a positive lens and (ii) a positive meniscus lens.

11. A zoom lens device according to claim 1, wherein said third lens unit comprises a negative lens subunit consisting of a positive lens cemented to a negative lens.

12. A zoom lens device according to claim 1, wherein said fourth lens unit comprises (i) a lens subunit consisting of a negative lens cemented to a positive lens and (ii) a positive lens.

13. A zoom lens device according to claim 1, wherein said fifth lens unit comprises a lens subunit consisting of a negative lens cemented to a positive lens.

14. A zoom lens device according to claim 1, further comprising a stop.

15. A zoom lens device according to claim 14, wherein said stop is disposed between said second lens unit and said third lens unit.

16. A zoom lens device according to claim 1, further comprising an optical block.

17. A zoom lens device according to claim 16, wherein said optical block is disposed at the image plane side of said fifth lens unit.

18. A zoom lens device according to claim 17, wherein said optical block comprises a crystal plate.

19. A zoom lens device according to claim 17, wherein said optical block comprises an infrared absorption filter.

20. A zoom lens device according to claim 1, wherein said fifth lens unit comprises, in order from the object side, a negative lens, a positive meniscus lens with its convex surface facing the image plane side, and a positive meniscus lens with its convex surface facing the object side.

21. A zoom lens device according to claim 1, wherein said second lens unit and said fourth lens unit move toward an image plane side during magnification change from the telephoto end to the wide-angle end.

22. A zoom lens device according to claims 1 or 2, wherein said first lens unit moves toward the object side during magnification change from the telephoto end to the wide-angle end.

23. A zoom lens device comprising, in order of lens units from the lens unit closest to an object side of said zoom lens device:

a first lens unit having a negative refractive power;
a second lens unit having a positive refractive power;
a third lens unit having a negative refractive power;
a fourth lens unit having a positive refractive power; and
a fifth lens unit having a positive refractive power,
wherein during magnification change, said first lens unit, said second lens unit, and said fourth lens unit move along an optical axis of said zoom lens device, while said third lens unit and said fifth lens unit are stationary,
wherein the following conditions are satisfied:

$0.7 < f_2/f_T < 1.2$ $2.2 < |f_3|/f_W < 3.5$, $0.6 < |f_3|/f_4 < 1.45$, and $f_T < f_4 < f_5$, where $f_2$, $f_3$, $f_4$, and $f_5$ represent the focal lengths of said second lens unit, said third lens unit, said fourth lens unit, and said fifth lens unit, respectively, and where $f_T$ and $f_W$ represent the focal lengths of said zoom lens device at a telephoto end and a wide-angle end, respectively, and wherein said first lens unit moves toward the object side and second lens unit and said fourth lens unit move toward an image plane side during magnification change from the telephoto end to the wide-angle end, said second lens unit moving by an amount larger than that of said fourth lens unit, wherein said first lens unit comprises, in order from the object side, a negative meniscus lens whose convex surface faces the object side, a negative lens, and a positive meniscus lens whose convex surface faces the object side, wherein said second lens unit comprises (i) a positive lens subunit consisting of a negative lens cemented to a positive lens and (ii) a positive meniscus lens, wherein said third lens unit comprises a negative lens subunit consisting of a positive lens cemented to a negative lens, wherein said fourth lens unit comprises (i) a lens subunit consisting of a negative lens cemented to a positive lens and (ii) a positive lens, and wherein said fifth lens unit comprises one of (i) a lens subunit consisting of a negative lens cemented to a positive lens and (ii) in order from the object side, a negative lens, a positive meniscus lens with its convex surface facing the image plane side, and a positive meniscus lens with its convex surface facing the object side.

24. A zoom lens device according to claim 23, wherein said fourth lens unit has at least one aspherical surface which is shaped so as to reduce a positive refractive power at a peripheral portion of the surface, and wherein said first lens unit has at least one aspherical surface which is shaped so as to increase a positive refractive power at a peripheral portion of the surface.

25. A zoom lens device according to claim 24, wherein a lens surface of said fourth lens unit which is closest to the image plane side is aspherically formed, and wherein a lens surface of said first lens unit which is closest to the object side is aspherically formed.

* * * * *

UNITED STATES PATENT AND TRADEMARK OFFICE
CERTIFICATE OF CORRECTION

PATENT NO.   : 5,739,960

DATED        : April 14, 1998

INVENTOR(S)  : Tsunefumi TANAKA

It is certified that error appears in the above-identified patent and that said Letters Patent is hereby corrected as shown below:

COLUMN 3:

Line 20, "$0.6<51\ f_3|/f_4<1.45$" should read --$0.6 < |f_3|/f_4 < 1.45$--.

COLUMN 10:

Line 32, "4.88834" should read --4.88831--.

Signed and Sealed this

Fourth Day of May, 1999

Attest:

Q. TODD DICKINSON

*Attesting Officer*   Acting Commissioner of Patents and Trademarks